United States Patent
Tokuchi

(10) Patent No.: US 11,551,161 B2
(45) Date of Patent: Jan. 10, 2023

(54) INFORMATION PROCESSING SYSTEM, INFORMATION PROCESSING APPARATUS, AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 259 days.

(21) Appl. No.: 16/851,852

(22) Filed: Apr. 17, 2020

(65) Prior Publication Data

US 2021/0201211 A1    Jul. 1, 2021

(30) Foreign Application Priority Data

Dec. 27, 2019 (JP) .............................. JP2019-239606

(51) Int. Cl.
*G06Q 10/02* (2012.01)
*G06Q 10/06* (2012.01)
*G06Q 20/08* (2012.01)

(52) U.S. Cl.
CPC ....... *G06Q 10/02* (2013.01); *G06Q 10/06312* (2013.01); *G06Q 20/085* (2013.01)

(58) Field of Classification Search
CPC . G06Q 10/02; G06Q 10/06312; G06Q 20/085
See application file for complete search history.

(56) References Cited

U.S. PATENT DOCUMENTS

| | | | | |
|---|---|---|---|---|
| 6,329,919 | B1 * | 12/2001 | Boies ..................... | G06Q 10/02 705/5 |
| 8,812,419 | B1 * | 8/2014 | Teller ..................... | G06Q 10/10 706/46 |
| 10,636,015 | B2 * | 4/2020 | Nagaraj ............. | G06Q 10/1095 |
| 2002/0016729 | A1 * | 2/2002 | Breitenbach ..... | G06Q 10/06311 707/999.1 |
| 2003/0004772 | A1 * | 1/2003 | Dutta .................. | G06Q 10/025 718/100 |
| 2003/0135458 | A1 * | 7/2003 | Tadano ................. | G06Q 10/02 705/40 |

(Continued)

FOREIGN PATENT DOCUMENTS

| | | |
|---|---|---|
| JP | S60-233769 A | 11/1985 |
| JP | 2002-63322 A | 2/2002 |

(Continued)

OTHER PUBLICATIONS

Gongjun Yan, "SmartParking: A secure and Intelligent Parking System", published by IEEE in 2010, all pages (Year: 2010).*

(Continued)

*Primary Examiner* — Omar Zeroual
(74) *Attorney, Agent, or Firm* — Oliff PLC

(57) ABSTRACT

An information processing system includes a processor configured to cancel a first reservation of a place made by a first person for a time window in a case where a predetermined condition is met, and in a case where the first reservation has been cancelled, transmit information indicating that the place has become available to a second person who made a second reservation of the place for a time window different from the time window of the first reservation.

13 Claims, 15 Drawing Sheets

(56) References Cited

U.S. PATENT DOCUMENTS

| | | | |
|---|---|---|---|
| 2004/0054726 A1* | 3/2004 | Doss | G06Q 10/109 709/205 |
| 2005/0227676 A1* | 10/2005 | De Vries | H04L 9/40 455/414.1 |
| 2006/0129444 A1* | 6/2006 | Baeza | G06Q 10/109 705/7.19 |
| 2006/0224427 A1* | 10/2006 | Salmon | G06Q 10/06312 705/7.22 |
| 2008/0086455 A1* | 4/2008 | Meisels | G01C 21/26 |
| 2008/0091480 A1* | 4/2008 | Geoghegan | G06Q 10/02 705/5 |
| 2008/0263632 A1* | 10/2008 | Keon | H04L 12/2854 726/3 |
| 2009/0094072 A1* | 4/2009 | Rodenberg | G06Q 10/02 705/5 |
| 2009/0164259 A1* | 6/2009 | Mizrachi | G06Q 10/02 707/999.102 |
| 2010/0004959 A1* | 1/2010 | Weingrad | G06Q 10/00 705/5 |
| 2010/0070314 A1* | 3/2010 | Jethani | G06Q 10/02 705/6 |
| 2010/0211427 A1* | 8/2010 | Morelli | G06Q 30/0601 705/26.1 |
| 2012/0203579 A1* | 8/2012 | Glasson | G06Q 10/02 705/5 |
| 2012/0246242 A1* | 9/2012 | Nykamp | H04L 51/23 709/206 |
| 2012/0265585 A1* | 10/2012 | Muirbrook | G07B 15/02 705/13 |
| 2014/0108121 A1* | 4/2014 | Norton | G06Q 10/02 705/14.35 |
| 2014/0172472 A1* | 6/2014 | Florimond | G06Q 20/102 705/5 |
| 2014/0229560 A1* | 8/2014 | Gray | G06Q 10/1095 709/206 |
| 2014/0258270 A1* | 9/2014 | Reese | G06F 16/24 707/722 |
| 2014/0278679 A1* | 9/2014 | Navani | G06Q 10/06311 705/7.19 |
| 2015/0120602 A1* | 4/2015 | Huffman | G06Q 10/083 700/214 |
| 2015/0213414 A1* | 7/2015 | Zuckerman | G06Q 10/1095 705/7.19 |
| 2015/0286992 A1* | 10/2015 | Dewane | G06Q 40/08 705/2 |
| 2015/0350910 A1* | 12/2015 | Eramian | H04W 12/50 726/6 |
| 2016/0140484 A1* | 5/2016 | Jancik | G06Q 10/083 705/5 |
| 2016/0145853 A1* | 5/2016 | Timur | G06F 30/13 52/27 |
| 2016/0253464 A1* | 9/2016 | Balwani | G06Q 10/02 705/2 |
| 2016/0328662 A1* | 11/2016 | Vinod | G06Q 10/02 |
| 2017/0169364 A1* | 6/2017 | Keen | H04L 67/306 |
| 2019/0130349 A1* | 5/2019 | Ferguson | G06Q 10/083 |
| 2019/0303804 A1* | 10/2019 | Bright | G06Q 10/02 |
| 2020/0027036 A1* | 1/2020 | Unnerstall | G06Q 20/40 |
| 2020/0104760 A1* | 4/2020 | Hashimoto | G06Q 10/06313 |
| 2020/0167701 A1* | 5/2020 | Debono | G06V 40/103 |
| 2020/0296056 A1* | 9/2020 | Fukuta | H04L 41/069 |
| 2020/0334586 A1* | 10/2020 | Petroulas | G06N 5/04 |
| 2021/0192951 A1* | 6/2021 | Ogura | G06Q 10/06315 |
| 2021/0216918 A1* | 7/2021 | Shaikh | G06Q 10/0631 |
| 2021/0281803 A1* | 9/2021 | Hirasawa | G06V 20/52 |

FOREIGN PATENT DOCUMENTS

| | | |
|---|---|---|
| JP | 2003-30354 A | 1/2003 |
| JP | 2012-3630 A | 1/2012 |
| WO | WO-2017198282 A1 * | 11/2017 |

OTHER PUBLICATIONS

Beatriz Benitez-Aurioles, "Why are flexible booking policies priced negatively?", published by Tourism Management via Elsevier.com On Feb. 22, 2018 (Year: 2018).*

Chih-Chien Chen, "Differentiation of cancellation policies in the U.S. hotel industry", published by International Journal of Hospitality Management via Elsevier.com in 2013, all pages (Year: 2013).*

* cited by examiner

FIG. 7

| | APRIL 5 | APRIL 6 | APRIL 7 |
|---|---|---|---|
| 07:00 TO 07:15 | | | |
| 07:15 TO 07:30 | | ↕ PERSON D | ↕ PERSON I |
| 07:30 TO 07:45 | | | |
| 07:45 TO 08:00 | ↕ PERSON E | | |
| 08:00 TO 08:15 | | | |
| 08:15 TO 08:30 | | | |
| 08:30 TO 08:45 | | | ↕ PERSON J |
| 08:45 TO 09:00 | | | |
| 09:00 TO 09:15 | ↕ PERSON F | ↕ | |
| 09:15 TO 09:30 | | PERSON A | |
| 09:30 TO 09:45 | ↕ PERSON G | | |
| 09:45 TO 10:00 | | } 7Y | |
| 10:00 TO 10:15 | | | |
| 10:15 TO 10:30 | | PERSON B | 7A (FIRST RESERVATION) |
| 10:30 TO 10:45 | | | |
| 10:45 TO 11:00 | ↕ PERSON H | ↕ | |
| 11:00 TO 11:15 | | } 7X | |
| 11:15 TO 11:30 | | ↕ PERSON C | |
| 11:30 TO 11:45 | | | ↕ PERSON K |
| 11:45 TO 12:00 | | | |

FIG. 8

| USER A | USER B | USER C |
|---|---|---|
| NAME: ........<br>BIRTH DATE: ........<br>AGE: ........<br>GENDER: ........<br>NATIONALITY: ........<br>ADDRESS: ........<br>TELEPHONE NUMBER: ........<br>PASSWORD: ........<br>USER ID: ........<br>CHARGING METHOD: ........ | NAME: ........<br>BIRTH DATE: ........<br>AGE: ........<br>GENDER: ........<br>NATIONALITY: ........<br>ADDRESS: ........<br>TELEPHONE NUMBER: ........<br>PASSWORD: ........<br>USER ID: ........<br>CHARGING METHOD: ........ | NAME: ........<br>BIRTH DATE: ........<br>AGE: ........<br>GENDER: ........<br>NATIONALITY: ........<br>ADDRESS: ........<br>TELEPHONE NUMBER: ........<br>PASSWORD: ........<br>USER ID: ........<br>CHARGING METHOD: ........ |

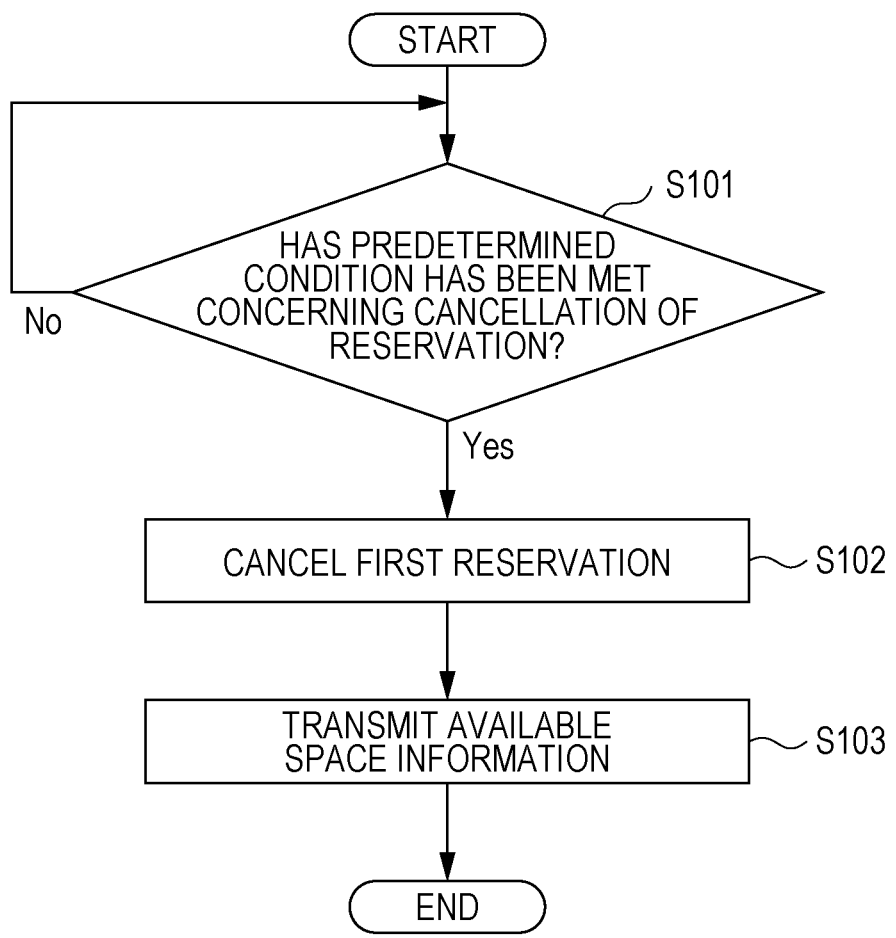

FIG. 11

| | APRIL 5 | APRIL 6 | APRIL 7 |
|---|---|---|---|
| 07:00 TO 07:15 | | | |
| 07:15 TO 07:30 | | ↕ PERSON D | ↕ PERSON I |
| 07:30 TO 07:45 | | | |
| 07:45 TO 08:00 | ↕ PERSON E | | |
| 08:00 TO 08:15 | | | ↕ PERSON J |
| 08:15 TO 08:30 | | | |
| 08:30 TO 08:45 | | | |
| 08:45 TO 09:00 | | | |
| 09:00 TO 09:15 | ↕ PERSON F | ↕ PERSON A | ← 11B |
| 09:15 TO 09:30 | | | |
| 09:30 TO 09:45 | ↕ PERSON G | } AVAILABLE | |
| 09:45 TO 10:00 | | | |
| 10:00 TO 10:15 | | ↕ | |
| 10:15 TO 10:30 | | PERSON B | } 11A (FIRST RESERVATION) |
| 10:30 TO 10:45 | | | |
| 10:45 TO 11:00 | ↕ PERSON H | ↕ | |
| 11:00 TO 11:15 | | } AVAILABLE | |
| 11:15 TO 11:30 | | ↕ | |
| 11:30 TO 11:45 | | ↕ PERSON C | ← 11C |
| 11:45 TO 12:00 | | | |

FIG. 13

| | APRIL 5 | APRIL 6 | APRIL 7 |
|---|---|---|---|
| 07:00 TO 07:15 | | | |
| 07:15 TO 07:30 | | ↕ PERSON D | ↕ PERSON I |
| 07:30 TO 07:45 | | | |
| 07:45 TO 08:00 | ↕ PERSON E | | |
| 08:00 TO 08:15 | | | |
| 08:15 TO 08:30 | | | |
| 08:30 TO 08:45 | | | ↕ PERSON J |
| 08:45 TO 09:00 | | | |
| 09:00 TO 09:15 | ↕ PERSON F | ↕ | |
| 09:15 TO 09:30 | | PERSON A | |
| 09:30 TO 09:45 | ↕ PERSON G | | |
| 09:45 TO 10:00 | | | |
| 10:00 TO 10:15 | | | |
| 10:15 TO 10:30 | | PERSON B | FIRST RESERVATION |
| 10:30 TO 10:45 | | (PROTECTED) | ← 13A |
| 10:45 TO 11:00 | ↕ PERSON H | ↕ | |
| 11:00 TO 11:15 | | | |
| 11:15 TO 11:30 | | ↕ PERSON C | |
| 11:30 TO 11:45 | | | ↕ PERSON K |
| 11:45 TO 12:00 | | | |

FIG. 15

| | APRIL 5 | APRIL 6 | APRIL 7 |
|---|---|---|---|
| 07:00 TO 07:15 | | | |
| 07:15 TO 07:30 | | ↕ PERSON D | ↕ PERSON I |
| 07:30 TO 07:45 | | | |
| 07:45 TO 08:00 | ↕ PERSON E | | |
| 08:00 TO 08:15 | | | |
| 08:15 TO 08:30 | | | |
| 08:30 TO 08:45 | | | ↕ PERSON J |
| 08:45 TO 09:00 | | | |
| 09:00 TO 09:15 | ↕ PERSON F | ↕ | |
| 09:15 TO 09:30 | | PERSON A | |
| 09:30 TO 09:45 | ↕ PERSON G | | |
| 09:45 TO 10:00 | | ↕ | |
| 10:00 TO 10:15 | | ↑ PERSON B | |
| 10:15 TO 10:30 | | (PROTECTED) | } FIRST RESERVATION |
| 10:30 TO 10:45 | | (PROTECTED TIME WINDOW 10:30 TO 11:00) | — 15A |
| 10:45 TO 11:00 | ↑ PERSON H | | |
| 11:00 TO 11:15 | ↓ | ↓ | |
| 11:15 TO 11:30 | | ↕ PERSON C | |
| 11:30 TO 11:45 | | | ↕ PERSON K |
| 11:45 TO 12:00 | | | |

INFORMATION PROCESSING SYSTEM, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-239606 filed Dec. 27, 2019.

BACKGROUND

(i) Technical Field

The present disclosure relates to an information processing system, an information processing apparatus, and a non-transitory computer readable medium.

(ii) Related Art

Japanese Unexamined Patent Application Publication No. 60-233769 discloses a seat reservation processing apparatus that has a waiting customer file in which customers who are waiting for cancellation of reservations are stored, a retrieval unit that retrieves a customer waiting for cancellation from the waiting customer file upon occurrence of cancellation, a notification unit that notifies the customer retrieved by the retrieval unit about confirmation of a reservation, and a unit that turns a confirmed reservation flag on.

Japanese Unexamined Patent Application Publication No. 2012-3630 discloses executing processing for reservation, cancellation, or waiting for cancellation in accordance with a status of reservations. After transmission of a processing result and a guide related to confirmation of a reservation, if there are persons who are waiting for cancellation of a reservation, the reservation is cancelled at a predetermined timing.

Japanese Unexamined Patent Application Publication No. 2003-30354 discloses processing for a reservation of a vehicle maintenance by using a computer. Specifically, reservation information is retrieved from a reservation storage unit in which reservation information of a maintenance factory is stored in response to a request from a user terminal, a webpage based on the reservation information is offered, a reservation for maintenance is received on the webpage, and information on the received reservation is stored in the reservation storage unit to update a reservation status.

Japanese Unexamined Patent Application Publication No. 2002-63322 discloses a system that enables retrieval and reservation of a rental conference room by using a computer system. The system has a stage in which an agent or a conference room provider register rental conference room information and a stage in which a user retrieves registered rental conference room information and makes a reservation.

SUMMARY

In a case where a place is no longer used by a user, information indicating that this place has become available may be transmitted to other persons. In this case, this place is more likely to be used by someone.

If persons to which the information indicating that the place has become available are not narrowed down, this information may be transmitted, for example, to a person who is utterly irrelevant with this place. Since this person will not use this place, a rate of use of this place presumably remains low.

Aspects of non-limiting embodiments of the present disclosure relate to heightening likelihood of use of a place as compared with a case where information indicating that a place has become available due to cancellation is not transmitted to a person who is likely to use the place.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a processor configured to cancel a first reservation of a place made by a first person for a time window in a case where a predetermined condition is met, and in a case where the first reservation has been cancelled, transmit information indicating that the place has become available to a second person who made a second reservation of the place for a time window different from the time window of the first reservation.

BRIEF DESCRIPTION OF THE DRAWINGS

An exemplary embodiment of the present disclosure will be described in detail based on the following figures, wherein:

FIG. 7 illustrates a reservation list stored in a hard disk drive of the space management server;

FIG. 8 illustrates a user list stored in the hard disk drive of the space management server;

FIG. 9 is a flowchart illustrating an example of flow of processing performed by a CPU, which is an example of a processor, provided in the space management server;

FIG. 11 illustrates another example of the reservation list;

FIG. 13 illustrates another example of the reservation list;

FIG. 15 illustrates another example of the reservation list.

DETAILED DESCRIPTION

An exemplary embodiment of the present disclosure is described below with reference to the drawings.

Figure 1:
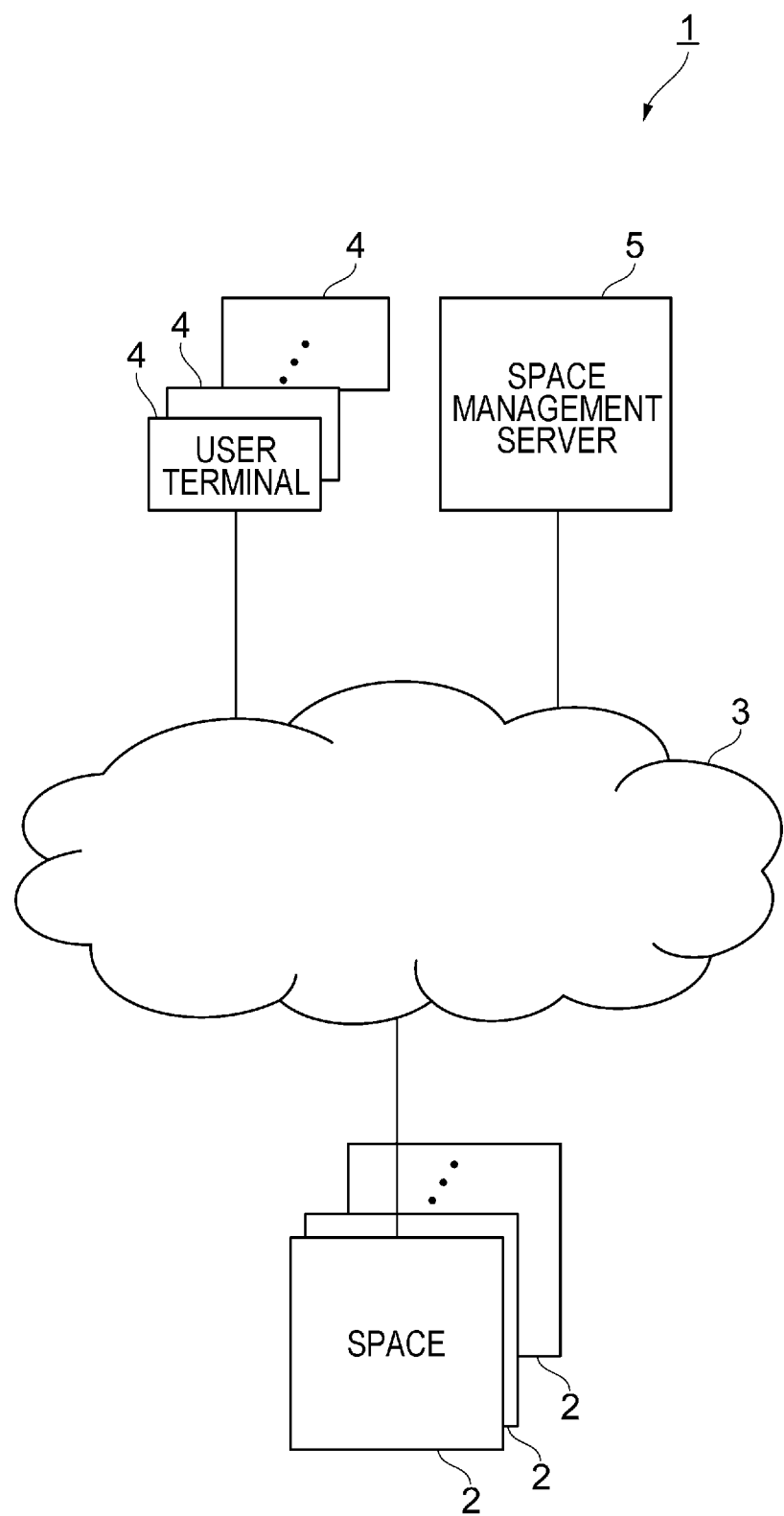
FIG. 1 schematically illustrates an overall configuration of an information processing system.

FIG. 1 schematically illustrates an overall configuration of an information processing system 1 according to the present exemplary embodiment.

In the present exemplary embodiment, plural spaces 2, which are an example of places reserved and used by a user, are provided.

In the present exemplary embodiment, each of the spaces 2 is reservable, and a user makes a reservation of a space 2 to use the space 2.

Examples of the spaces 2 include booths, guest rooms of a facility such as an accommodation facility, and conference rooms of a company. These are examples of the spaces 2 that are partitioned from surroundings by a wall, a partition, or the like.

Furthermore, examples of the spaces 2 according to the present exemplary embodiment include tables and seats on which service is offered at a restaurant, a barber shop, or the like. These are examples of the spaces 2 opened to surroundings.

The information processing system 1 illustrated in FIG. 1 includes various terminals connected to a cloud network 3.

In FIG. 1, user terminals 4 operated by users and a space management server 5 that manages the spaces 2 are illustrated as examples of the terminals connected to the cloud network 3. Furthermore, the spaces 2 are connected to the cloud network 3. More specifically, various apparatuses are provided in the spaces 2, and these apparatuses are connected to the cloud network 3.

The spaces 2 may be managed by a single business operator or plural business operators. For example, different business operators may be in charge of management of reservations, management of entry into and exit from rooms, statuses of usage of rooms, and the like, management of charging of usage fees on users, and management of members registered as users.

As described above, the spaces 2 managed as targets reserved by users need not be spaces of the same type. For example, some of the spaces 2 may be booths, and some of the spaces 2 may be seats or tables of a restaurant or the like.

Furthermore, management of a single purpose or function may be provided by plural business operators in cooperation.

In the present exemplary embodiment, doors of the spaces 2 are equipped with an electronic lock so that the spaces 2 can be locked. In the present exemplary embodiment, persons who have an authority to unlock the spaces 2 can access the spaces 2.

To unlock a space 2, a person who tries to unlock the space 2 gives an unlocking instruction by operating his or her user terminal 4. This instruction is sent to the space management server 5, and the space management server 5 receives the instruction. Then, the space management server 5 gives an instruction to unlock the space 2 for which the unlocking instruction is aimed. This causes the electronic lock of the space 2 to operate, thereby unlocking the space 2.

In the present exemplary embodiment, it is assumed that the user terminals 4 are smartphones, which are portable. Note, however, that the portable user terminals 4 may be wearable terminals, notebook computers, or gaming terminals.

The space management server 5 manages various kinds of information related to the spaces 2. For example, the space management server 5 manages information for specifying users, information for specifying the spaces 2 reserved by users, start dates and times of reservations, and end dates and times of reservations.

Examples of the information for specifying users include users' names, genders, ages, accounts, user IDs, passwords, and information for management given to the individuals. Examples of the information for specifying the spaces 2 used by users include information for specifying places such as addresses or locations and names and numbers for management.

The space management server 5 may manage reservations of articles and services associated with the spaces 2. For example, the space management server 5 may manage articles and services that are permitted to be borrowed or used and consumed or consumable articles and services.

Furthermore, the space management server 5 manages various kinds of information related to usage of the spaces 2. For example, the space management server 5 manages information on statuses of usage of the spaces 2 and information on users of the spaces 2.

Furthermore, the space management server 5 unlocks and locks the spaces 2.

The space management server 5 also functions as a control apparatus and controls the various apparatuses provided in the spaces 2. Note that a control apparatus may be provided in each of the spaces 2, and various apparatuses provided in each of the spaces 2 may be controlled by the control apparatus provided in the space 2.

Appearance Configuration of Spaces 2

Figure 2:
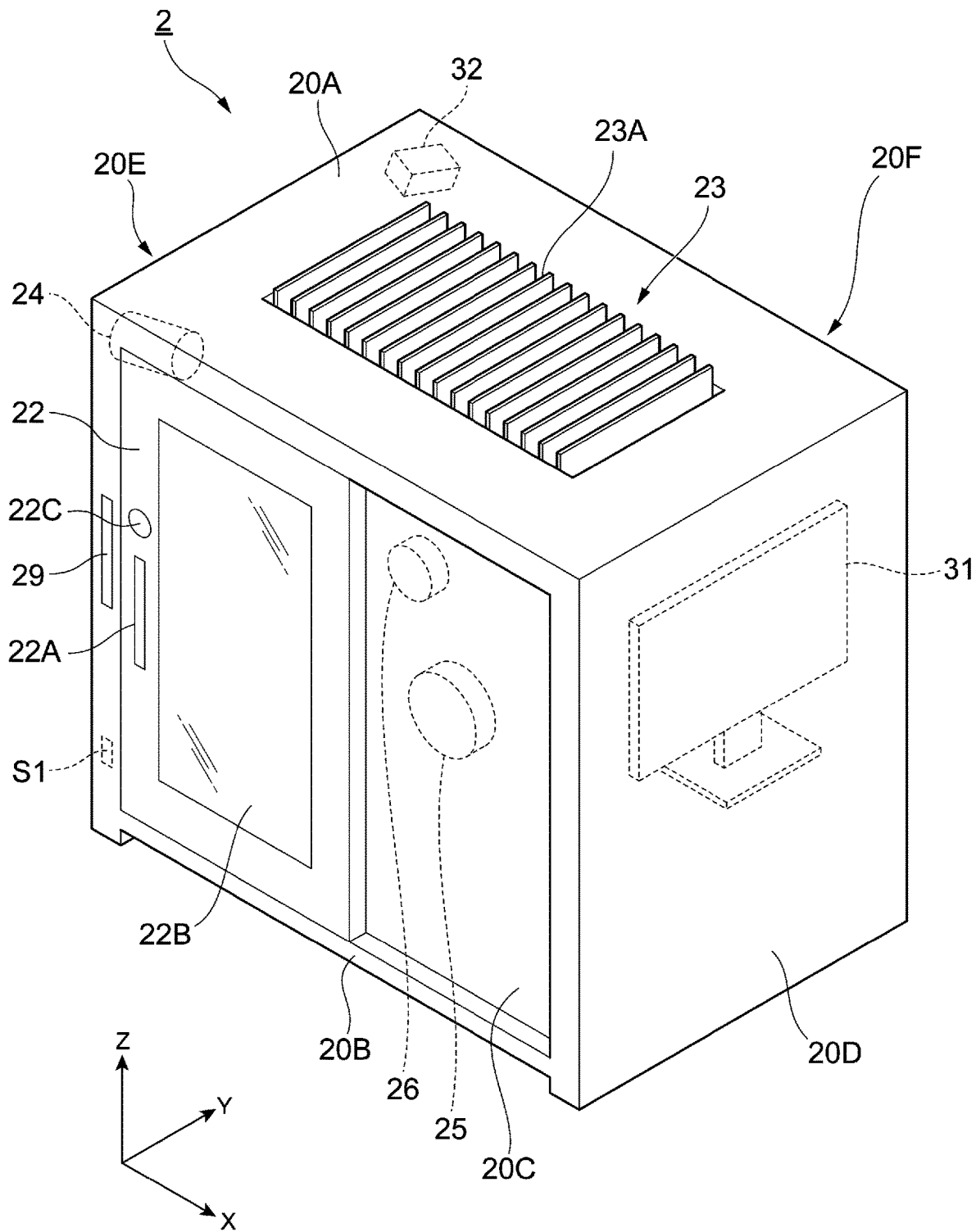
FIG. 2 is a view for explaining an example of a booth-type space.

FIG. 2 is a view for explaining an example of a booth-type space 2.

The booth-type space 2 illustrated in FIG. 2 is placed at an indoor or outdoor place such as a train station, an airport, an office building, a commercial facility such as a restaurant or a department store, a bank, a library, an art museum, a museum, a public institution or facility, an accessway, or a park.

The booth-type space 2 illustrated in FIG. 2 is a closed-type booth provided with a ceiling. Note that the closed type does not mean "completely closed" and just needs to have practical sound insulation.

A body of the space 2 illustrated in FIG. 2 includes a ceiling 20A, a floor 20B, a wall 20C equipped with a door 22, which is openable and closable, two walls 20D and 20E located on both sides of the wall 20C, and a wall 20F that faces the door 22.

In the present exemplary embodiment, the space 2 is surrounded by the wall 20C, the door 22, the wall 20D, the wall 20E, and the wall 20F, and a room 200 is created inside these four walls and the door 22 by these four walls and the door 22.

In the present exemplary embodiment, it is assumed that the door 22 is a sliding door that is movable along the wall 20C. Although the door 22 is a single sliding door that slides in one direction in FIG. 2, the door 22 may be a sliding doorset including two or more members sliding on respective lanes or a sliding doorset including two members sliding on a single lane.

In the present exemplary embodiment, the door 22 is provided with a handle 22A used by a user to open or close the door 22. Furthermore, the door 22 is provided with an electronic lock 22C that can lock and unlock the door 22. Furthermore, in the present exemplary embodiment, the door 22 is provided with an opening closing sensor S1 that detects opening and closing of the door 22.

The number of persons which the space 2 accommodates is roughly determined by a volume of the space 2. In the present exemplary embodiment, it is assumed that the space 2 is a cabin-type space that is basically used by a single person.

Note, however, that the space 2 may be a large room that accommodates a large number of persons. The large room may be a single independent room or may be a room created by connecting plural rooms 2 by removing one of or both of the walls 20D and 20E of the spaces 2.

Note that the cabin type does not mean that only one person can use the space and means that a small number of persons (e.g., two or three persons) can use the space.

A shape and a structure of the body, equipment, and performance of the space 2 are not limited in particular. For example, the ceiling 20A may be removed.

In the present exemplary embodiment, a single desk (not illustrated) and a single chair (not illustrated) are placed in the body. Furthermore, prepared equipment and apparatuses and reserved equipment and apparatuses are placed in the body.

Furthermore, a monitor 31, which is a display device for displaying an image, is provided in the body as standard equipment.

In the present exemplary embodiment, a speaker 32, which is a sound output device for outputting sound, is provided. Alternatively, sound may be output from a speaker of the monitor 31 without separately providing the speaker 32.

In the present exemplary embodiment, a photographing apparatus 24 that photographs an inside of the space 2 is provided. The photographing apparatus 24 has an imaging element such as a Charge Coupled Device or a CMOS and photographs an inside of the space 2 by using this imaging element.

Furthermore, a human sensor 25 that detects a user in the space 2 is provided in the space 2. Furthermore, in the present exemplary embodiment, a temperature sensor 26 that detects a temperature in the space 2 is provided.

Furthermore, as illustrated in FIG. 2, an information acquisition device 29 for acquiring individual information of a user of the space 2 may be provided on an outer face of the body.

The information acquisition device 29 is, for example, a reader that reads an ID card held by a user. Alternatively, the information acquisition device 29 may be a reader that reads a fingerprint, a pattern of veins, and the like of a user.

Figure 3:
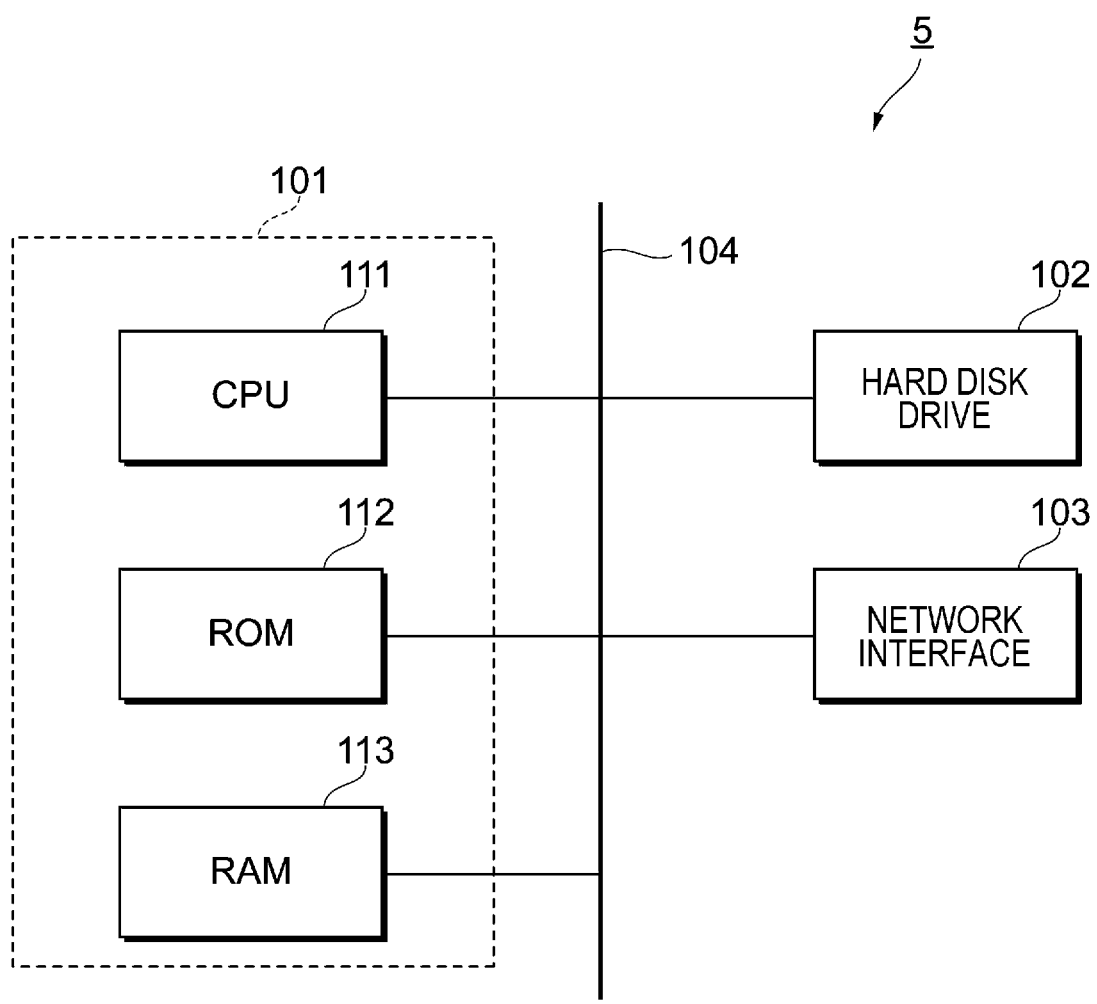
FIG. 3 is a view for explaining an example of a hardware configuration of a space management server.

FIG. 3 is a view for explaining an example of a hardware configuration of the space management server 5.

The space management server 5, which is an example of an information processing apparatus, has a control unit 101 that controls operation of the whole server, a hard disk drive 102 in which data such as management data is stored, and a network interface 103 that achieves communication through a local area network (LAN) cable or the like.

The control unit 101 has a central processing unit (CPU) 111, which is an example of a processor, a read only memory (ROM) 112 in which basic software, a basic input output system (BIOS), and the like are stored, and a random access memory (RAM) 113 used as a work area.

The CPU 111 may be a multi-core CPU. The ROM 112 may be a rewritable non-volatile semiconductor memory. The control unit 101 is a computer.

The hard disk drive 102 is a device that writes and reads data into and from a non-volatile storage medium having a disc-shaped substrate coated with a magnetic substance. Note, however, that the non-volatile storage medium may be a semiconductor memory or a magnetic tape.

In addition, the space management server 5 includes an input device such as a keyboard or a mouse and a display device such as a liquid crystal display device as needed.

The control unit 101, the hard disk drive 102, and the network interface 103 are connected through a bus 104 or a signal line (not illustrated).

A program executed by the CPU 111 may be offered to the space management server 5 while being stored in a computer-readable recording medium such as a magnetic recording medium (e.g., a magnetic tape, a magnetic disc), an optical recording medium (e.g., an optical disc), a magnetooptical recording medium, or a semiconductor memory. Alternatively, a program executed by the CPU 111 may be offered to the space management server 5 by using means of communication such as the Internet.

In the present exemplary embodiment, the term "processor" refers to a processor in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

Furthermore, the term "processor" is broad enough to encompass one processor or plural processors in collaboration which are located physically apart from each other but may work cooperatively. The order of operations of the processor is not limited to one described in the present exemplary embodiment, and may be changed.

Figure 4:
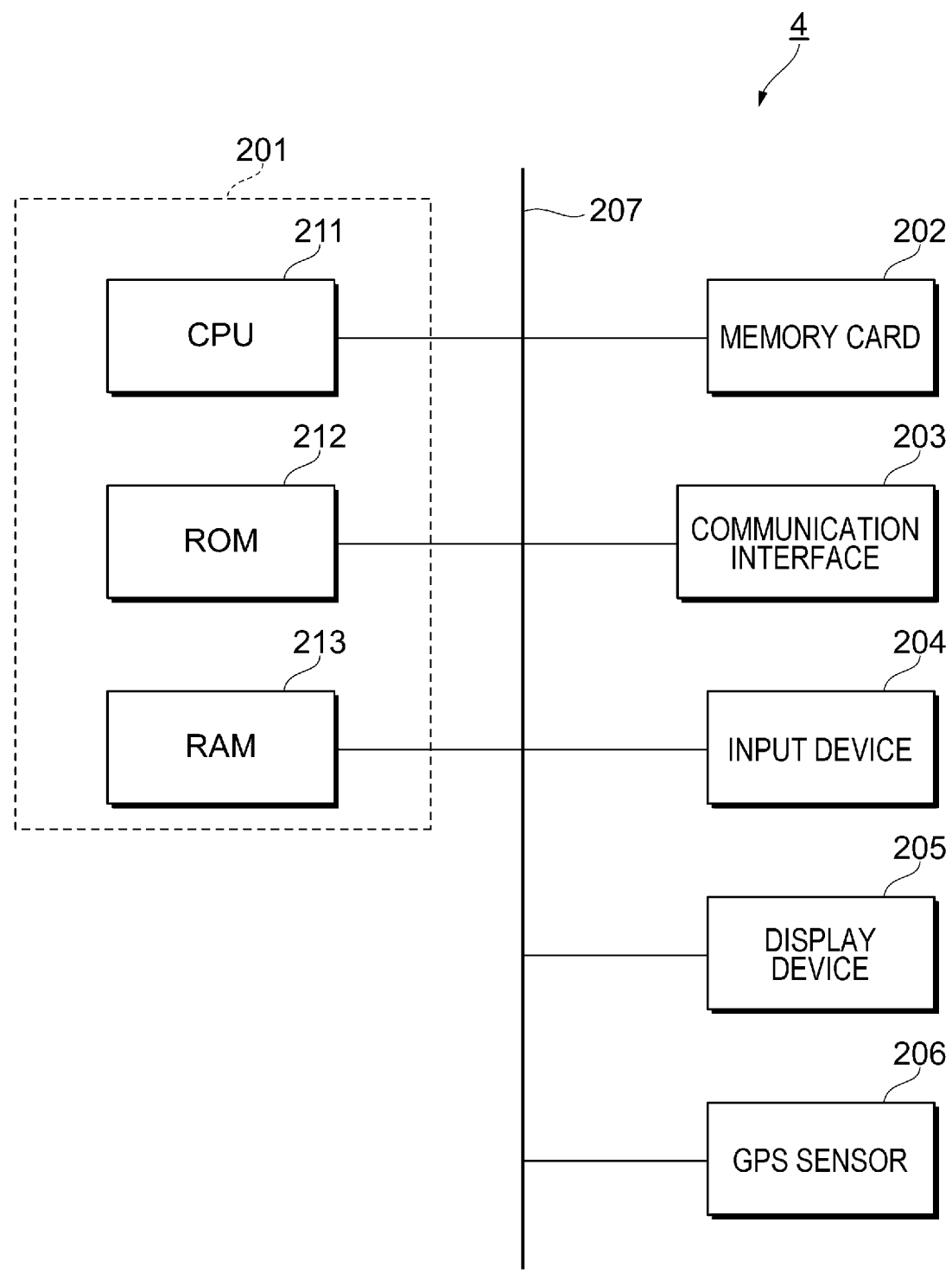
FIG. 4 is a diagram illustrating an example of a hardware configuration of a user terminal.

FIG. 4 is a diagram illustrating an example of a hardware configuration of the user terminal 4. FIG. 4 illustrates a case where the user terminal 4 is a smartphone.

The user terminal 4 has a control unit 201 that controls operation of the whole device, a memory card 202 in which various kinds of data are stored, various communication interfaces 203 that are compliant with a wireless communication standard, an input device 204 such as a touch sensor, a display device 205 such as a liquid crystal display device or an electro luminescence display device, and a global positioning system (GPS) sensor 206.

The control unit 201 has a CPU 211, a ROM 212 in which firmware, BIOS, and the like are stored, and a RAM 213 used as a work area. The CPU 211 may be a multi-core CPU. The ROM 212 may be a rewritable non-volatile semiconductor memory.

The communication interfaces 203 are, for example, an interface used for connection with a mobile communication system and an interface used for connection with a wireless LAN.

The GPS sensor 206 is a sensor that measures a position of the user terminal 4 on the basis of a radio wave received from a GPS satellite. Information on latitude, longitude, and altitude supplied from the GPS sensor 206 gives a current position of the user terminal 4. Note that the GPS sensor 206 may support an indoor position measurement system.

Figure 5:
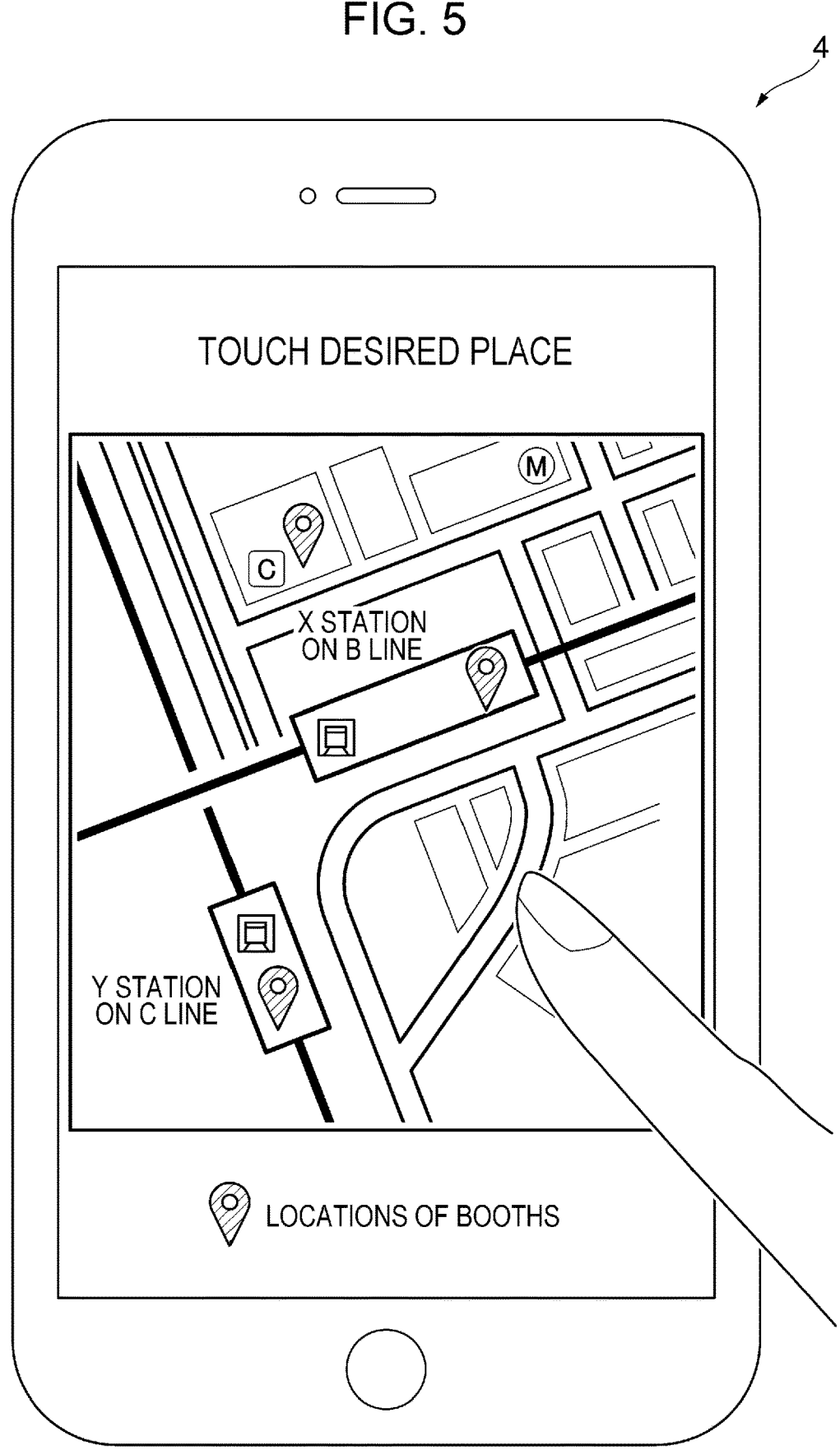
FIG. 5 illustrates an example of a display screen displayed on a user terminal of a person who requests to reserve a space.

FIG. 5 illustrates an example of a display screen displayed on the user terminal 4 of a person who requests to reserve a space 2.

On the display screen illustrated in FIG. 5, a map is displayed, and plural locations of the spaces 2, which are examples of places which a person requests to reserve, are displayed on the map.

In the present exemplary embodiment, a person who wants to reserve a space 2 first selects a location from among the plural locations of the spaces 2 displayed on the map.

Note that the way in which the plural locations of the spaces 2 are displayed is not limited to this. For example, the plural locations of the spaces 2 may be displayed in a list form, and the person may select a location from the list.

Figure 6:
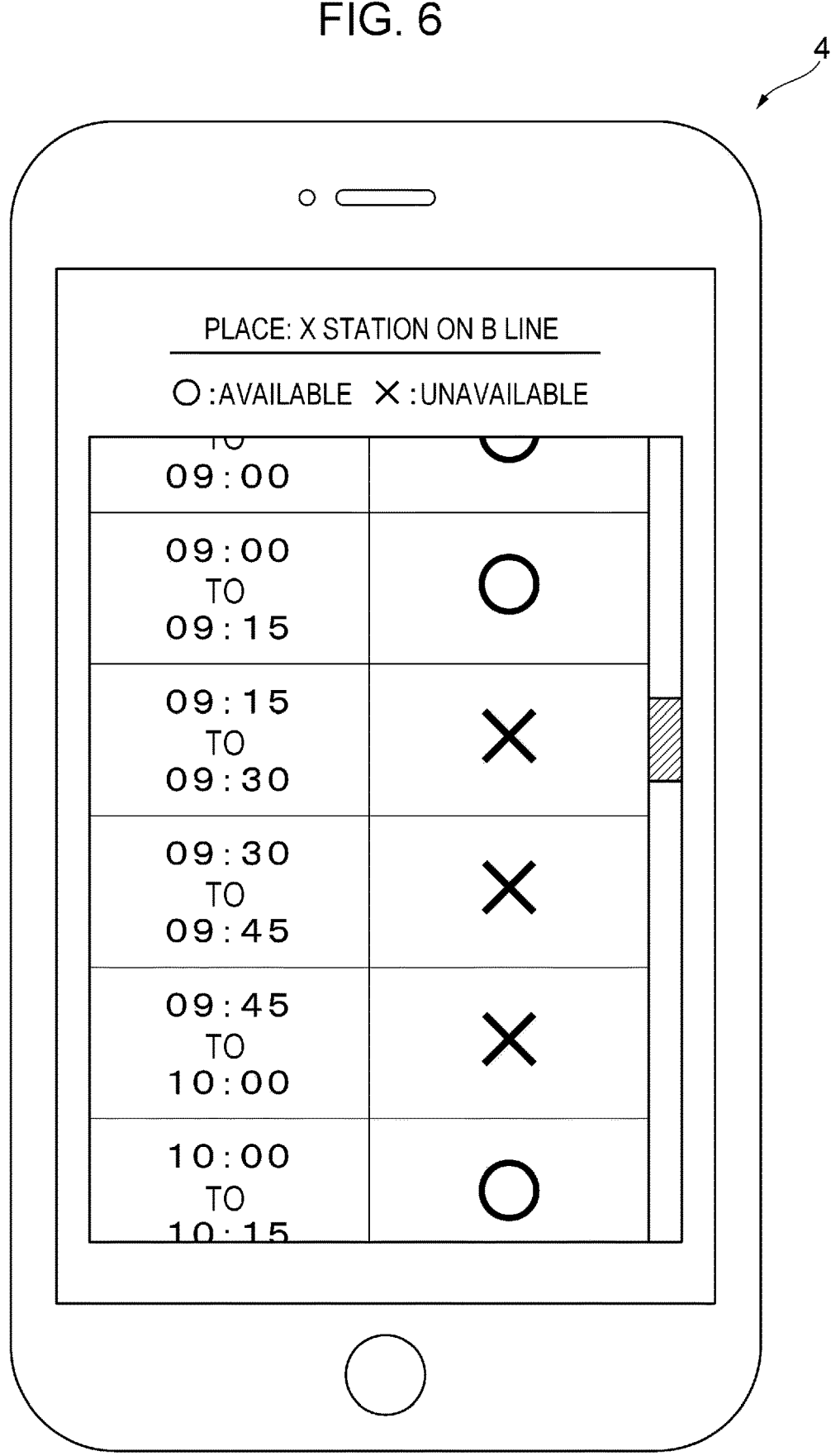
FIG. 6 illustrates another example of the display screen displayed on the user terminal.

When the person selects a location, availability of the space 2 at the selected location is displayed as illustrated in FIG. 6, which illustrates another example of a display screen displayed on the user terminal 4. In FIG. 6, time windows for which the space 2 has already been reserved and time windows for which the space 2 is still available are distinguishable.

The person designates a time window for which the person wants to reserve the space 2 on the display screen. Then, the person presses "Reserve" button (not illustrated). The length, start time, and end time of the time window may be freely set by the person.

This causes the space management server 5 to reserve the space 2 for the time window.

More specifically, the space management server 5 receives information on the location of the space 2 and the time window and registers the information on the location of the space 2 and the time window in the hard disk drive 102 (FIG. 3).

Then, a confirmation of the reservation is sent to the user terminal 4, and thus the person is informed that the reservation has been confirmed.

FIG. 7 illustrates a reservation list stored in the hard disk drive 102 (FIG. 4) of the space management server 5.

In the present exemplary embodiment, when a reservation of a space 2 made by a person is confirmed, this person is added to the reservation list as illustrated in FIG. 7. More specifically, in the reservation list, a person who made a reservation is registered in a field corresponding to a time window reserved by the person.

In particular, in the present exemplary embodiment, information (hereinafter referred to as "schedule information") on schedule of a space 2 is registered in the hard disk drive 102 of the space management server 5.

In the example illustrated in FIG. 7, information indicating that a person A has made a reservation for a time window 09:00 to 10:00 on April 6 is registered as schedule information.

Furthermore, in this example, information indicating that a person B has made a reservation for a time window 10:00 to 11:00 on April 6 is registered as schedule information.

Furthermore, in this example, information indicating that a person C has made a reservation for a time window 11:00 to 11:30 on April 6 is registered as schedule information.

Similarly, information indicating that a person has made a reservation is registered in other time windows.

In the present exemplary embodiment, a minimum reservable time window is 15 minutes. In particular, in the present exemplary embodiment, a person can reserve a space 2 in units of 15 minutes.

FIG. 8 illustrates a user list stored in the hard disk drive 102 of the space management server 5.

In the present exemplary embodiment, users of the spaces 2 need to complete user registration in advance. In the present exemplary embodiment, the users who try to register themselves as users enter information such as their names, birth dates, ages, genders, addresses, telephone numbers, and passwords, for example, on their user terminals 4.

In the present exemplary embodiment, these pieces of information are registered in the user list.

In the user list, information such as a name, a birth date, an age, a gender, an address, and a telephone number is registered in association with each user, as illustrated in FIG. 8.

In the user list, passwords set by the users and user IDs allocated to the users are also registered in association with the respective users.

Furthermore, in the user list, charging systems selected by users are registered in association with the respective users.

In particular, in the present exemplary embodiment, each user selects a charging system when making a contract with a business operator who runs the spaces 2. In the present exemplary embodiment, the selected charging system is registered in the user list in association with the user.

In the present exemplary embodiment, each user is charged a fee based on a charging system registered in the user list in association with the user.

Examples of the charging system include a flat-rate charging system for charging a user a fixed fee per predetermined period (e.g., one month) and a usage-based charging system for charging a user a fee per usage of a space 2.

In a case where a user selects the flat-rate charging system, the user can use a space 2 a predetermined number of times or without limit, for example, for one month.

In the present exemplary embodiment, upon receipt of an instruction to unlock a space 2 from a user terminal 4, the space management server 5 compares a person who gave the instruction to unlock the space 2 with persons registered in the reservation list (see FIG. 7), and, if the person who gave the instruction to unlock the space 2 is registered in the reservation list, unlocks the space 2.

More specifically, in the present exemplary embodiment, when a person who has made a reservation tries to unlock a space 2, the person enters an ID and a password on his or her user terminal 4. Through this authentication process, the operator who is operating the user terminal 4 is identified.

Then, in the present exemplary embodiment, when an instruction to unlock the space 2 is received from the user terminal 4 on which the operator has been authenticated, it is determined whether or not the operator who gave the instruction to unlock the space 2 is registered in the reservation list. In a case where the operator who gave the instruction to unlock the space 2 is registered in the reservation list, the space management server 5 unlocks the space 2.

FIG. 9 is a flowchart illustrating an example of flow of processing executed by the CPU 111, which is an example of a processor, provided in the space management server 5.

More specifically, FIG. 9 is a flowchart illustrating flow of processing for cancellation of a reservation executed by the CPU 111.

Although an example in which the processing is executed by the CPU 111 provided in the space management server 5 is described in the present exemplary embodiment, the processing executed in the present exemplary embodiment may be executed by plural CPUs that are physically separate from one another.

In particular, the processing executed in the present exemplary embodiment may be executed in cooperation by plural CPUs that are provided in respective plural information processing apparatuses. In this case, an information processing system for executing processing concerning the spaces 2 is constituted by the plural information processing apparatuses.

The CPU 111 according to the present exemplary embodiment determines whether or not a predetermined condition concerning cancellation of a reservation has been met, for example, at predetermined time intervals (step S101).

In a case where it is determined in step S101 that the predetermined condition has been met, the CPU 111 cancels a reservation (hereinafter referred to as a "first reservation") of a space 2 made by a first person for a time window (step S102).

In a case where the CPU 111 cancels the first reservation of the space 2, the CPU 111 transmits information (hereinafter referred to as "available space information") indicating that the space 2 has become available to a second person who made a reservation (an example of a "second reservation") of the space 2 for a time window different from the time window of the first reservation (step S103).

In other words, in a case where the CPU 111 cancels the first reservation of the space 2, the CPU 111 transmits information (hereinafter referred to as "available space information") indicating that the space 2 has become available to a second person who made a reservation of the space 2 that is a reservation of a time window different from the time window of the first reservation.

The "second person who made a reservation of the space 2" is not limited to a second person who still has the reservation of the space 2 at a time of the cancellation of the first reservation and encompasses a second person who had a reservation of the space 2 for a time window earlier than the time of the cancellation of the first reservation.

In other words, the "second person who made a reservation of the space 2" encompasses a second person who made a reservation of the space 2 for a time window later than the time of the cancellation of the first reservation so that this second person can use the space 2 for this time window.

In addition, the "second person who made a reservation of the space 2" encompasses a second person who made a reservation of the space 2 for a time window earlier than the time of the cancellation of the first reservation.

Furthermore, the "second person who made a reservation of the space 2" encompasses not only a person who will actually use the space 2, but also a person who made a reservation of the space 2 on behalf of a person who will actually use the space 2.

In particular, in a case where the CPU 111 cancels the first reservation of the space 2, the CPU 111 transmits the available space information to a user terminal 4 of a second person who made a reservation of the space 2 for a time window starting later than the time of the cancellation and a user terminal 4 of a second person who made a reservation of the space 2 for a time window starting earlier than the time of the cancellation.

This is described by using a specific example with reference to FIG. 7. For example, in a case where the CPU 111 cancels a first reservation (a reservation made by a person B) of a space 2 indicated by 7A in FIG. 7 for a time window 10:00 to 11:00, the CPU 111 transmits available space information to a second person who made a reservation of this space 2 for a time window different from the time window 10:00 to 11:00 of the first reservation.

In particular, the CPU 111 transmits available space information to a second person who made a reservation that enables use of the space 2 for a time window different from the time window 10:00 to 11:00 of the first reservation.

Specifically, in the example illustrated in FIG. 7, second persons made reservations of the space 2 for time windows on April 5, April 6, and April 7, and the CPU 111 transmits available space information to these second persons.

For example, in a case where the CPU 111 cancels the first reservation indicated by 7A in FIG. 7 at 10:11 on April 6, the CPU 111 transmits available space information to second persons who made reservations for time windows later than 10:11 and second persons who made reservations for time windows earlier than 10:11.

In the present exemplary embodiment, a first reservation of a space 2 is cancelled in a case where a user arrives at the space 2 later than a start of a time window of the first reservation.

More specifically, in the present exemplary embodiment, a reservation (first reservation) of a space 2 is cancelled in a case where a user does not arrive at the space 2 even after elapse of a predetermined period from a start of a time window of the first reservation.

For example, the CPU 111 cancels the first reservation indicated by 7A in FIG. 7 at 10:11 in a case where a user has not arrived yet even after elapse of 10 minutes from 10:00, which is a start of the time window of the first reservation.

In this case, in the present exemplary embodiment, the CPU 111 transmits available space information to second persons who made reservations for time windows later than 10:11 and second persons who made reservations for time windows earlier than 10:11.

With this configuration, in the present exemplary embodiment, even in a case where a user does not appear at a space 2, this space 2 is more likely to be used by someone. This increases a rate of use of the space 2.

The increased rate of use of the space 2 provides more opportunities to earn money from users, thereby improving earnings of the business operator who runs the space 2.

The CPU 111 also cancels a first reservation in a case where a first person who made the first reservation gives an instruction to cancel the first reservation before start of a time window of the first reservation.

In this case, the first reservation is canceled before the start of the time window of the first reservation.

In this case, the CPU 111 transmits available space information to second persons who made reservations of the space 2 for time windows that start later than a time of the cancellation of the first reservation and second persons who made reservations of the space 2 for time windows that start earlier than the time of the cancellation of the first reservation.

Figure 10:
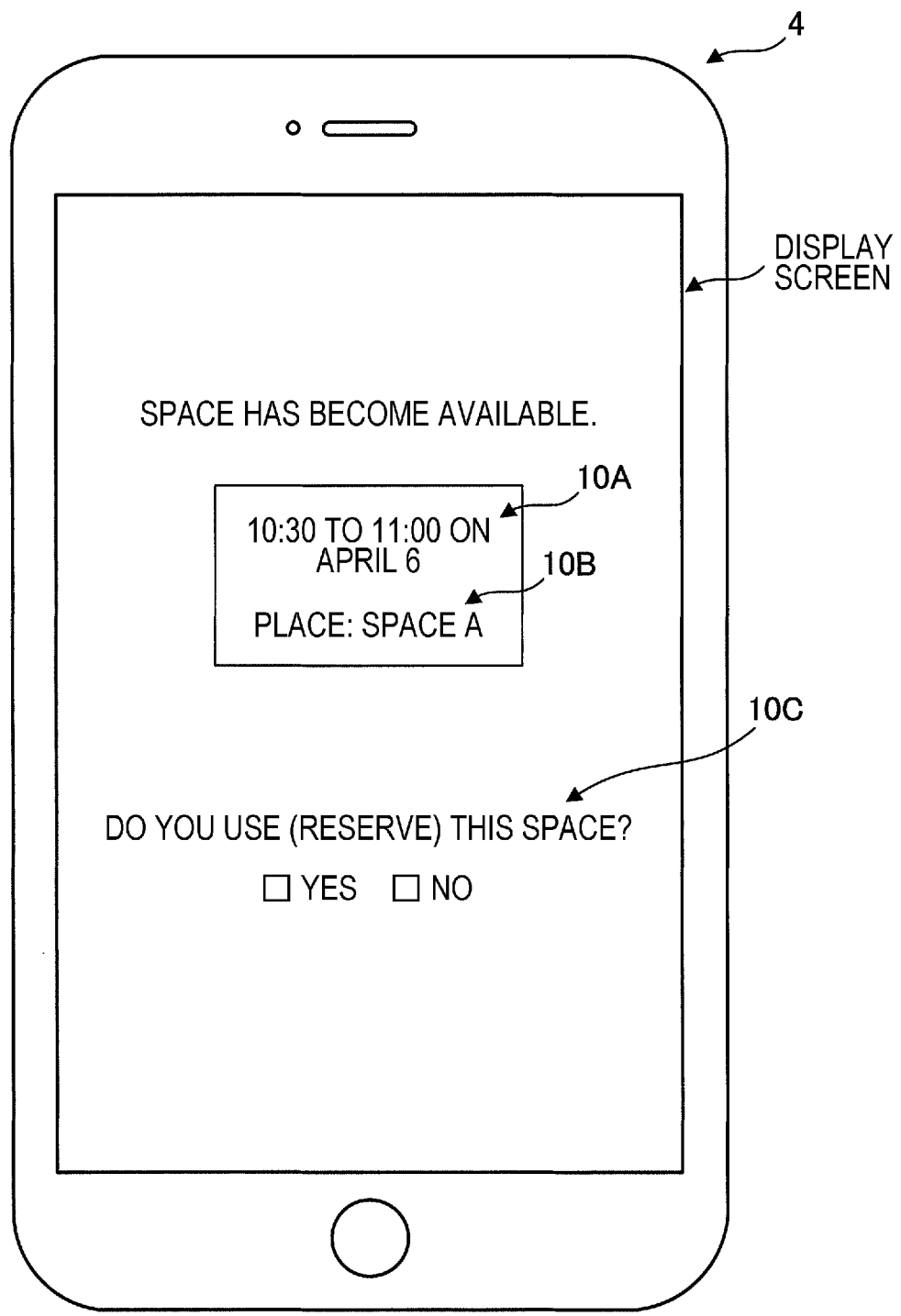
FIG. 10 illustrates a display screen of a user terminal to which available space information has been transmitted.

FIG. 10 illustrates a display screen of the user terminal 4 that has received available space information.

On the display screen of the user terminal 4 that has received available space information, information on a time window of a space 2 that has become available is displayed. In particular, a time window for which a reservation has been cancelled and a user can make a new reservation is displayed.

FIG. 10 illustrates a display screen displayed on the user terminal 4 of a second person in a case where the first reservation indicated by 7A in FIG. 7 is cancelled at 10:11.

In this example, a time window 10:30 to 11:00 on April 6 (see 10A in FIG. 10) is displayed as a time window for which the second person can make a new reservation.

Furthermore, information on a location of the space 2 (see 10B in FIG. 10) is displayed on the display screen. The location of the space 2 displayed on the display screen matches a location of a space 2 which the second person who received the available space information reserved.

Furthermore, the display screen of the user terminal 4 includes a message (see 10C in FIG. 10) inquiring of the second person whether to request to reserve the space 2.

In the present exemplary embodiment, in a case where the second person requests to reserve the space 2 on the user terminal 4, information on this second person is newly registered in the reservation list (see FIG. 7).

The CPU 111 may transmit the available space information to all of the second persons or may transmit the available space information to one or more of the second persons.

For example, the CPU 111 may transmit the available space information to a second person who made a reservation of the space 2 for a time window that is on a date of the first reservation.

In particular, the CPU 111 may transmit the available space information to a second person who made a reservation of the space 2 for a time window that is on the same date as the date of the first reservation.

More specifically, for example, in a case where the CPU 111 cancels the first reservation indicated by 7A in FIG. 7 (the first reservation for a time window 10:00 to 11:00 on April 6) at 10:11 on April 6, the CPU 111 transmits the available space information to second persons D, A, and C who made reservations of the space 2 for time windows that are on April 6.

Alternatively, for example, in a case where the CPU 111 cancels the first reservation indicated by 7A in FIG. 7 (the first reservation for a time window 10:00 to 11:00 on April 6) at 8:30 on April 6 on the basis of an instruction from the first person, the CPU 111 transmits the available space information to second persons D, A, and C who made reservations of the space 2 for time windows that are on April 6.

Second persons who made reservations of a space 2 for time windows that are on a date of a first reservation (hereinafter referred to as a "first reservation date") of the space 2 are more likely to be close to the space 2 than second persons who made reservations of the space 2 for time windows that are on a date different from the first reservation date.

In a case where available space information is transmitted to the second persons who made reservations of the space 2 for time windows that are on the same date as the first reservation, likelihood of use of the space 2 increases.

In a case where the CPU 111 transmits the available space information to second persons who made a reservation of the space 2, the CPU 111 may transmit the available space information to second persons who made a reservation of the space 2 and actually used the space 2 based on this reservation.

The second persons who actually used the space 2 are more likely to be close to the space 2 than second persons who did not use the space 2. Transmitting the available space information to the second persons who actually used the space 2 further increases likelihood of use of the space 2.

Note that whether or not a second person actually used a space 2 is determined, for example, based on whether or not the second person actually unlocked the space 2.

Alternatively, the CPU 111 may transmit the available space information to a second person who made a reservation immediately succeeding the first reservation.

Alternatively, the CPU 111 may transmit the available space information to a second person who made a reservation immediately preceding the first reservation.

This is described by using a specific example with reference to FIG. 7. For example, in a case where the CPU 111 cancels the first reservation indicated by 7A at 10:11 on April 6, the CPU 111 transmits the available space information to the person C who made a reservation immediately succeeding the first reservation and the person A who made a reservation immediately preceding the first reservation.

For example, in a case where the CPU 111 cancels the first reservation indicated by 7A at 8:30 on April 6, the CPU 111 transmits the available space information to the person C who made a reservation immediately succeeding the first reservation and the person A who made a reservation immediately preceding the first reservation.

The "second person who made a reservation immediately succeeding the first reservation" is not limited to a second person who made a reservation for a time window immediately succeeding the time window of the first reservation and encompasses a second person who made a reservation for a time window that comes after the time window of the first reservation with an available time window interposed therebetween.

More specifically, for example, in a case where a time window of a first reservation (see 11A) is followed by an available time window (a time window for which no reservation has been made) and a second user has a reservation (see 11C) for a time window immediately succeeding this available time window as illustrated in FIG. 11, which illustrates another example of the reservation list, this second person is the "second person who made a reservation immediately succeeding the first reservation".

Furthermore, the "second person who made a reservation immediately preceding the first reservation" is not limited to a second person who made a reservation for a time window immediately preceding the time window of the first reservation and encompasses a second person who made a reservation for a time window that comes before the time window of the first reservation with an available time window interposed therebetween.

More specifically, for example, in a case where the time window of the first reservation (see 11A) immediately follows an available time window (a time window for which no reservation has been made) and a second user has a reservation (see 11B) for a time window immediately preceding this available time window as illustrated in FIG. 11, this second person is the "second person who made a reservation immediately preceding the first reservation".

In a case where the second person who made a reservation immediately succeeding the first reservation becomes able to use the space 2 for the time window for which the space 2 has become available, the second person becomes able to use the space 2 for a longer time.

Similarly, in a case where the second person who made a reservation immediately preceding the first reservation becomes able to use the space 2 for the time window for which the space 2 has become available, the second person becomes able to use the space 2 for a longer time.

More specifically, the second person who made a reservation immediately preceding the first reservation becomes able to make a new reservation continuously from his or her reservation and therefore becomes able to use the space 2 for a longer time.

In particular, it is possible that the second person really wanted to use the space 2 for a longer time but had no choice but to reserve the space 2 for a shorter time due to the first reservation.

In this case, in a case where available space information is transmitted to the second person who made a reservation immediately succeeding the first reservation or to the second person who made a reservation immediately preceding the first reservation as in the present exemplary embodiment, it becomes more likely that the space 2 will be used by the second person who wants to use the space 2 for a longer time.

Furthermore, it is possible that the second person really wanted to use the space 2 for the time window of the first reservation but had no choice but to make a reservation for a time window succeeding the time window of the first reservation or a time window preceding the time window of the first reservation due to the first reservation.

In this case, in a case where available space information is transmitted to the second person who made a reservation immediately succeeding the first reservation or to the second person who made a reservation immediately preceding the first reservation as in the present exemplary embodiment, the second person becomes able to use the space 2 for a time window for which the second user really wanted to use the space 2.

The available space information may be transmitted to only one of the second person (hereinafter referred to as a "succeeding second person") who made a reservation for a time window later than the time window of the first reservation and the second person (hereinafter referred to as a "preceding second person") who made a reservation for a time window earlier than the time window of the first reservation or may be transmitted to both of the second person who made a reservation for a time window later than the time window of the first reservation and the second person who made a reservation for a time window earlier than the time window of the first reservation.

That is, the available space information may be transmitted to only one of the succeeding second person and the preceding second person or may be transmitted to both of the succeeding second person and the preceding second person.

More desirably, the available space information is transmitted to the succeeding second person.

A preceding second person who has already finished using the space 2 may be already far from the space 2. In this case, it is less likely that the space 2 will be used by this preceding second person.

Meanwhile, a succeeding second person who made a reservation for a time window later than the time window of the first reservation may be close to the space 2 which the succeeding second person is planning to use. In this case, it is more likely that the space 2 that has become available will be used by this succeeding second person.

The CPU 111 may transmit the available space information to a second person who made a reservation for a time window immediately succeeding the time window of the first reservation.

The CPU 111 may transmit the available space information to a second person who made a reservation for a time window immediately preceding the time window of the first reservation.

Specifically, in this case, for example, the CPU 111 transmits the available space information to the person C, who made a reservation for a time window indicated by 7X in FIG. 7, and the person A, who made a reservation for a time window indicated by 7Y in FIG. 7.

As in the above case, the available space information may be transmitted to only one of the second person who made a reservation for a time window immediately succeeding the time window of the first reservation and the second person who made a reservation for a time window immediately preceding the time window of the first reservation or may be transmitted to both of the second person who made a reservation for a time window immediately succeeding the time window of the first reservation and the second person who made a reservation for a time window immediately preceding the time window of the first reservation.

As in the above case, it is desirable that the available space information be transmitted to at least the second person who made a reservation for a time window immediately succeeding the time window of the first reservation.

In the example illustrated in FIG. 11, no reservation has been made for the time window immediately succeeding the time window of the first reservation and for the time window immediately succeeding the time window of the first reservation. In this case, the CPU 111 does not transmit the available space information.

In particular, in a case where the available space information is transmitted to the second person who made a reservation for a time window immediately succeeding the time window of the first reservation and the second person who made a reservation for a time window immediately preceding the time window of the first reservation, the available space information is not transmitted if the space 2 is available in the time window immediately succeeding the time window of the first reservation and the time window immediately preceding the time window of the first reservation as illustrated in FIG. 11.

In a case where the available space information is transmitted to the second person who made a reservation for a time window immediately succeeding the time window of the first reservation and the second person who made a reservation for a time window immediately preceding the time window of the first reservation, it becomes more likely that the space 2 will be used by a second person who wants to use the space 2 for a longer time as in the above case.

In this case, a second person who wanted to use the space 2 for the time window of the first reservation becomes able to use the space 2 for the time window of the first reservation.

Reservation Cancellation Process

Next, the reservation cancellation process is described in detail. In particular, the process in step S102 (see FIG. 9) is described in more detail.

In the present exemplary embodiment, the CPU 111 cancels the first reservation upon receipt of an instruction from the first person to cancel the first reservation as described above.

The CPU 111 also cancels the first reservation in a case where a user does not arrive at the space 2 for which the first reservation has been made.

More specifically, the CPU 111 cancels the first reservation by deleting information on the first person from the reservation list.

The "user" is a concept encompassing not only a person who made a reservation of a space 2 but also a person permitted to use the space 2. In the present exemplary embodiment, the space 2 may be used not only by a person who made a reservation of this space 2 but also, for example, by a person designated by the person who made a reservation of this space 2. In this case, the designated person is also a "user".

In the present exemplary embodiment, a person designated by a person who made a reservation is also registered in the reservation list and the user list, and this designated person also uses a space 2 by unlocking the space 2.

The person who made a reservation designates a person, for example, by operating his or her user terminal 4.

In the present exemplary embodiment, the CPU 11 cancels the first reservation of the space 2 in a case where a user does not arrive at the space 2 before a predetermined time, as described above.

More specifically, in the present exemplary embodiment, the CPU 111 cancels the first reservation of the space 2 in a case where a user does not arrive at the space 2, for example, even after elapse of 10 minutes from a start of a time window of the reservation.

In particular, the CPU 111 cancels the first reservation of the space 2 in a case where a user does not arrive at the space 2 even after elapse of a predetermined period from a start of a time window of the reservation.

In this case, the CPU 111 transmits available space information to a second person as described in step S103 (see FIG. 9).

In the present exemplary embodiment, this prevents the reservation of the space 2 from being kept although a user does not arrive at the space 2. As a result, it becomes more likely that the space 2 will be used by someone.

The CPU 111 determines whether or not a user has arrived before elapse of the predetermined period, for example, based on whether or not an unlocking instruction has been given before elapse of the predetermined period.

Alternatively, the CPU 111 determines whether or not a user has arrived before elapse of the predetermined period, for example, based on whether or not opening and closing of the door 22 are detected by the opening closing sensor S1 before elapse of the predetermined period.

The CPU 111 may be configured to cancel the first reservation in a case where the first person made the first reservation under a flat-rate charging system and not to cancel the first reservation in a case where the first person made the first reservation under a usage-based charging system for charging a fee per usage of the space 2.

In particular, the CPU 111 cancels the first reservation in a case where a user does not arrive at the space 2 before a predetermined time and the first reservation was made under a flat-rate charging system.

Meanwhile, the CPU 111 maintains the first reservation without cancelling the first reservation in a case where the first reservation was made under a usage-based charging system for charging a fee per usage of the space 2.

It can be assumed that in a case where the first reservation was made under a flat-rate charging system, a user often does not arrive at the space 2. In this case, the space 2 often remains unoccupied.

More specifically, in a case where a flat-rate charging system is selected, a user is not charged an extra fee in many cases even if the user does not appear at the space 2. Accordingly, the user is less motivated to use the space 2 and is therefore less likely to appear at the space 2. In this case, it is more likely that the space 2 be unoccupied. That is, a rate of use of the space 2 decreases.

In this case, if the first reservation is cancelled, the reservation of the space 2 that is unlikely to be used is cancelled. This allows another user who wants to use this space 2 to use the space 2.

Meanwhile, in a case where the first reservation was made under a usage-based charging system for charging a fee per usage of the place, the person suffers a loss in many cases unless the person uses the space 2. In this case, a user is more likely to appear at the space 2. As a result, a rate of use of the space 2 increases.

More specifically, under a usage-based charging system, a user is often charged a fee irrespective of whether or not the user uses the space 2 unless a reservation is cancelled before a predetermined time (e.g., a start time of a time window of the reservation). In this case, the user is more likely to appear at the space 2. As a result, a rate of use of the space 2 increases.

Under such a circumstance, if the first reservation is forcibly cancelled, the user is charged a fee although the user becomes unable to use the space 2. In this case, it is more likely that the first reservation be cancelled although the user has intention to use the space 2.

Meanwhile, in a case where the first reservation made under a usage-based charging system for charging a fee per usage of the space 2 is kept as in the present exemplary embodiment, such a problem is less likely to occur.

In the present exemplary embodiment, the CPU 111 also cancels the first reservation upon receipt of an instruction from the first person to cancel the first reservation.

Also in this case, the CPU 111 transmits available space information to a second person as described in step S103.

More specifically, the CPU 111 transmits the available space information to a second person who made a reservation for a time window later than a time of the cancellation of the first reservation and a second person who made a reservation for a time window earlier than the time of the cancellation of the first reservation.

Transmitting Process

In the present exemplary embodiment, in a case where the CPU 111 cancels the first reservation (performs the process in step S102 (see FIG. 9)) as described above, the CPU 111 transmits information (hereinafter referred to as "cancellation information") indicating that the first reservation has been cancelled to the first person who made the first reservation.

In a case where the CPU 111 cancels the first reservation, the CPU 111 may always transmit the cancellation information or may transmit the cancellation information when a specific condition is met.

Specifically, the CPU 111 may transmit the cancellation information to the first person who made the first reservation, for example, only in a case where the first reservation has been cancelled without an instruction from the first user to cancel the first reservation.

In particular, in the present exemplary embodiment, the first reservation is sometimes cancelled even without an instruction from the first person to cancel the first reservation as described above, and the CPU 111 may transmit the cancellation information only in this case.

More specifically, in the present exemplary embodiment, the first reservation is sometimes forcibly cancelled in a case where a user does not arrive at the space 2 by a predetermined time as described above, and the CPU 111 may transmit the cancellation information only in this case.

In particular, in a case where the first reservation is cancelled based on an instruction from the first person, the first person knows that the first reservation will be cancelled, and a problem is less likely to occur even if the cancellation information is not transmitted to the first person.

Meanwhile, in a case where the first reservation is cancelled without an instruction from the first person, the first person is unaware of the cancellation of the first reservation, and therefore it is desirable to transmit the cancellation information to the first person.

Alternatively, the CPU 111 may be configured not to cancel the first reservation in a case where information indicative of prohibition of cancellation of a reservation is registered in association with the first reservation.

More specifically, in the present exemplary embodiment, the CPU 111 does not cancel the first reservation in a case where information indicative of prohibition of cancellation of a reservation is registered in association with the first reservation.

In a case where this processing is performed, the first person who attempts to make a reservation registers information indicative of prohibition of cancellation of a reservation by operating the user terminal 4.

In particular, the first person who attempts to make a reservation gives an instruction to prohibit cancellation of a reservation by operating the user terminal 4.

Figure 12:
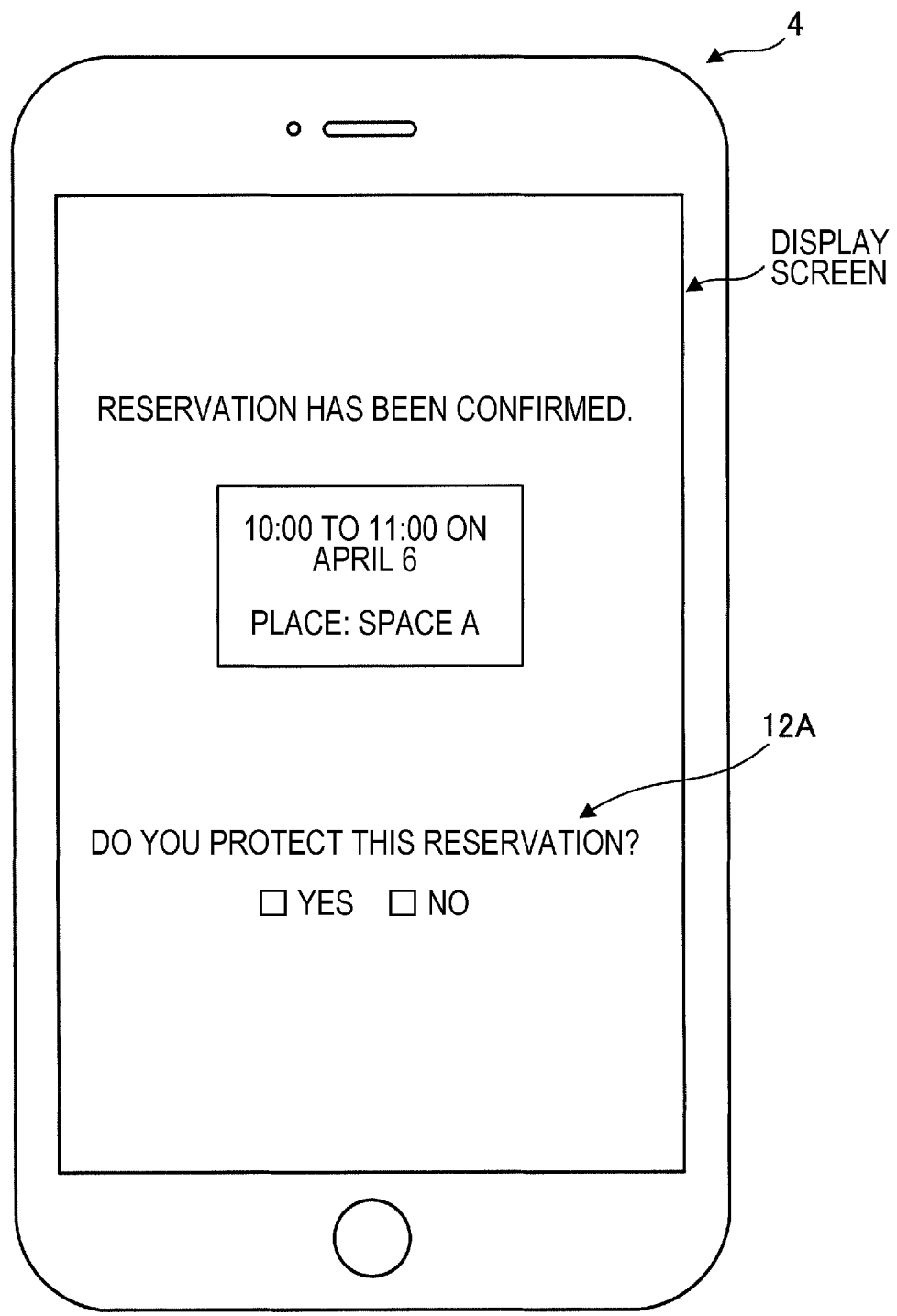
FIG. 12 illustrates an example of the display screen of the user terminal.

More specifically, for registration of information indicative of prohibition of cancellation of a reservation, a message for receiving a request to prohibit cancellation of a reservation is displayed on the user terminal 4 as indicated by 12A in FIG. 12, which illustrates an example of a display screen of the user terminal 4. In particular, a message for receiving a request to protect a reservation is displayed.

In the present exemplary embodiment, in a case where an instruction from the first person to prohibit cancellation of a reservation is received on the user terminal 4, information indicative of prohibition of cancellation of a reservation is registered in the reservation list in association with the first reservation as indicated by 13A in FIG. 13, which illustrates another example of the reservation list.

In this case, the CPU 111 does not cancel the first reservation even in a case where the first person does not arrive at the space 2 before a predetermined time. In this case, the first reservation is not forcibly cancelled.

The first person may want to keep a reservation. In a case where the first person can register information indicative of registration of cancellation of a reservation as in the present exemplary embodiment, the reservation is prevented from being forcibly cancelled.

In a case where the first person registers information indicative of prohibition of cancellation of a reservation, the first person may be charged an additional fee.

In a case where information indicative of registration of cancellation of a reservation is registered in association with a first reservation, the CPU 111 may be configured to cancel a reservation of a time window of the first reservation other than a time window designated by the first person and not to cancel a reservation of the designated time window of the first reservation.

In particular, the CPU 111 may cancel a reservation of a time window of the first reservation other than a time window designated by the first person and keep a reservation of the designated time window of the first reservation.

In this case, the reservation of the time window designated by the first person is kept, and a user can use the space 2 for this time window for which the reservation is kept.

Meanwhile, the reservation of the time window other than the time window designated by the first person is cancelled, and the space 2 can be offered to a second person for the time window other than the time window designated by the first person.

Also in this case, in a case where the first person registers information indicative of prohibition of cancellation of a reservation, this first person may be charged an additional fee.

Figure 14:
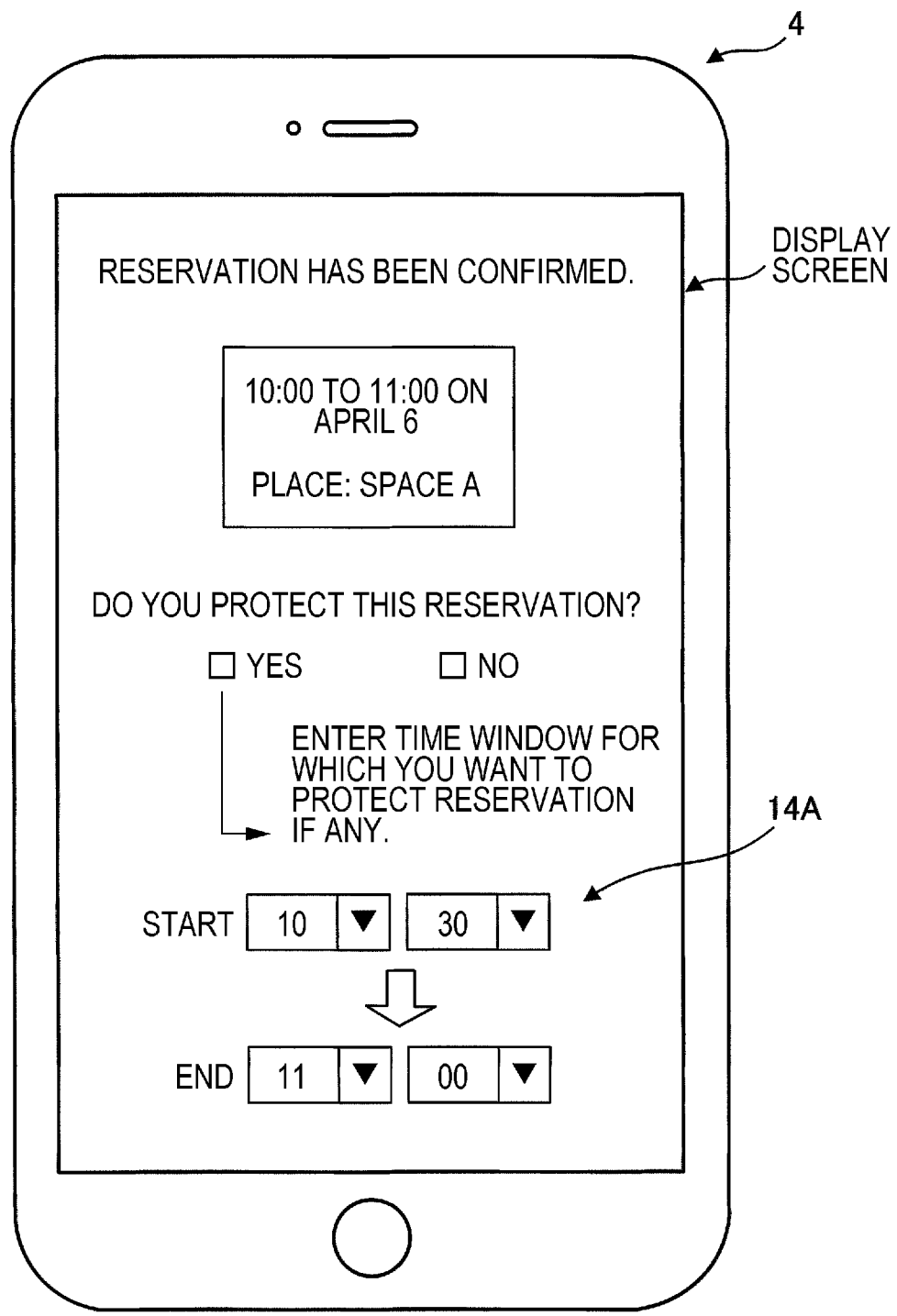
FIG. 14 illustrates a display example of the user terminal.

This is described below by using a specific example. In a case where this processing is performed, an entry field for designating a time window for which the first person wants to protect a reservation is displayed on the user terminal 4 as indicated by 14A in FIG. 14, which illustrates a display example on the user terminal 4.

The first person designates a time window in this entry field. Information on the designated time window is transmitted to the space management server 5, and the designated time window is registered in the reservation list in association with the first reservation as indicated by 15A in FIG. 15, which illustrates another example of the reservation list.

In this case, the CPU 111 cancels a reservation of a time window of the first reservation other than the designated time window and keeps a reservation of the designated time window of the first reservation.

Processing for Transmitting Available Space Information

Next, processing for transmitting available space information is described in detail.

In the present exemplary embodiment, the CPU 111 transmits available space information to a second person who made a reservation of a space 2 for a time window different from a time window of a first reservation of the space 2 made by a first person, as described above.

The CPU 111 may transmit the available space information to a second person who meets a specific condition.

More specifically, for example, the CPU 111 may transmit the available space information to a second person who made a reservation of the space 2 for a time window that is on the same date as the first reservation as described above.

Alternatively, for example, the CPU 111 may transmit the available space information to a second person who selected a usage-based charging system for charging a fee per usage of the space 2.

In particular, the CPU 111 may be configured not to transmit the available space information to a second person who selected a flat-rate charging system and to transmit the available space information to a second person who selected a usage-based charging system for charging a fee per usage of a place.

As described above, the second person who selected a flat-rate charging system is less motivated to go to the space 2 and is less likely to appear at the space 2.

In this case, even in a case where the available space information is transmitted to a second person who selected a flat-rate charging system, this second person may not appear at the space 2.

Meanwhile, in a case where the available space information is transmitted to a second person who selected a usage-based charging system for charging a fee per usage of a place and this second person makes a reservation of the space 2, this second person is more likely to go to the space 2.

Other Remarks

The CPU 111 may decide a second person to which available space information is to be transmitted on the basis of positional information of second persons.

More specifically, for example, in a case where a user does not arrive at a space 2 even after elapse of a predetermined period from a start of a time window of a first reservation of the space 2, the CPU 111 may transmit available space information to a second person located within a predetermined distance from the space 2.

More desirably, the CPU 11 transmits the available space information to a second person who is located within the predetermined distance from the space 2 and made a reservation of the space 2 for a time window that is on the same date as the first reservation.

More desirably, the CPU 11 transmits the available space information to a second person who is located within the predetermined distance from the space 2 and made a reservation of the space 2 for a time window later than the time window of the first reservation on the same date as the first reservation.

In a case where this processing is performed, the space 2 is more likely to be used by someone than a case where the available space information is transmitted to a second person located far from the space 2.

Note that the second person who is located within the predetermined distance from the space 2 is specified, for example, on the basis of positional information obtained by the GPS sensor 206 (see FIG. 4) provided in the user terminal 4.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising a terminal; and
    a server that includes a processor configured to: cancel a first reservation of a place made by a first person for a first time window where a predetermined condition is met,
    due to cancelling the first reservation, transmit information indicating that the place has become available to the terminal, and
    unlock the place when a signal is received from the terminal requesting the place to be unlocked for the first time window, wherein the terminal is used by a second person who made a second reservation of the place for a second time window different from the first time window, the signal indicates that the second person has been authenticated by the terminal,
    the processor cancels the first reservation where the first person made the first reservation under a flat-rate charging system, and
    the processor does not cancel the first reservation where the first person made the first reservation under a charging system for charging a fee per usage of the place.

2. The information processing system according to claim 1, wherein
    the second reservation is on a date of the first reservation.

3. The information processing system according to claim 1, wherein
    the second reservation immediately succeeds the first reservation and/or the second reservation immediately precedes the first reservation.

4. The information processing system according to claim 1, wherein
    the second time window is immediately succeeding the first time window and/or the second time window is immediately preceding the first time window.

5. The information processing system according to claim 1, wherein
    due to cancelling the first reservation, the processor transmits information indicating that the first reservation has been cancelled to the first person.

6. The information processing system according to claim 5, wherein
    the first reservation has been cancelled without an instruction from the first person, and the processor transmits the information indicating that the first reservation has been cancelled to the first person.

7. The information processing system according to claim 1, wherein
    the processor cancels the first reservation because a user of the place does not arrive at the place.

8. The information processing system according to claim 1, wherein
    the processor does not cancel the first reservation where information indicative of prohibition of reservation cancellation is registered in association with the first reservation.

9. The information processing system according to claim 8, wherein
    the processor changes the first reservation to be different than the first time window and indicates that the first time window is available.

10. The information processing system according to claim 1, wherein
    the second person meets a specific condition.

11. The information processing system according to claim 10, wherein
    the second person made the second reservation under a charging system for charging a fee per usage of the place.

12. An information processing apparatus comprising a processor configured to:
    cancel a first reservation of a place made by a first person for a first time window where a predetermined condition is met,
    due to cancelling the first reservation, transmit information indicating that the place has become available to a second person who made a second reservation of the place for a second time window different from the first time window, and
    unlock the place when a signal is received from a terminal that has authenticated the second person, the signal requesting the place to be unlocked for the first time window, wherein the processor cancels the first reservation where the first person made the first reservation under a flat-rate charging system; and
    the processor does not cancel the first reservation where the first person made the first reservation under a charging system for charging a fee per usage of the place.

13. A non-transitory computer readable medium storing a program causing a computer to execute a process for information processing, the process comprising:
    cancelling a first reservation of a place made by a first person for a first time window where a predetermined condition is met,
    due to cancelling the first reservation, transmitting information indicating that the place has become available to a second person who made a second reservation of the place fora second time window different from the first time window, and
    unlocking the place when a signal is received from a terminal that has authenticated the second person, the signal requesting the place to be unlocked for the first time window, wherein the first reservation is cancelled where the first person made the first reservation under a flat-rate charging system; and
    the first reservation is not cancelled where the first person made the first reservation under a charging system for charging a fee per usage of the place.

* * * * *